(12) United States Patent
Sakata et al.

(10) Patent No.: US 8,504,642 B2
(45) Date of Patent: *Aug. 6, 2013

(54) SYSTEMS AND METHODS FOR INVOKING COMMANDS ACROSS A FEDERATION

(75) Inventors: Jayson G. Sakata, Encino, CA (US); Robert J. Peters, Santa Monica, CA (US)

(73) Assignee: Edgecast Networks, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/595,176

(22) Filed: Aug. 27, 2012

(65) Prior Publication Data

US 2013/0046807 A1 Feb. 21, 2013

Related U.S. Application Data

(63) Continuation of application No. 13/449,183, filed on Apr. 17, 2012, now Pat. No. 8,275,851, which is a continuation of application No. 13/336,592, filed on Dec. 23, 2011, now Pat. No. 8,190,702, which is a continuation of application No. 13/246,762, filed on Sep. 27, 2011, now Pat. No. 8,117,276.

(60) Provisional application No. 61/524,294, filed on Aug. 16, 2011.

(51) Int. Cl.
*G06F 15/167* (2006.01)

(52) U.S. Cl.
USPC .......................................... 709/216; 709/213

(58) Field of Classification Search
USPC ................... 709/213–216, 223–226
See application file for complete search history.

(56) References Cited

U.S. PATENT DOCUMENTS

| | | |
|---|---|---|
| 6,266,401 B1 | 7/2001 | Marchbanks et al. |
| 6,405,252 B1 | 6/2002 | Gupta et al. |
| 6,442,551 B1 | 8/2002 | Ofek |
| 6,502,125 B1 | 12/2002 | Kenner et al. |
| 6,591,266 B1 | 7/2003 | Li et al. |
| 6,795,868 B1 | 9/2004 | Dingman et al. |
| 6,799,221 B1 | 9/2004 | Kenner et al. |
| 6,961,716 B2 | 11/2005 | Rhodes |

(Continued)

OTHER PUBLICATIONS

Brad Cain et al., Content Network Advertisement Protocol (CNAP), Jan. 1, 2003, pp. 1-33.

(Continued)

*Primary Examiner* — Brendan Higa
(74) *Attorney, Agent, or Firm* — Los Angeles Patent Group; Arman Katiraei

(57) ABSTRACT

Some embodiments provide different frameworks for seamlessly issuing and executing commands across servers of different federation participants. Each framework facilitates issuance and execution of a command that originates from a first federation participant and that is intended for execution at servers of a second federation participant. In some embodiments, a framework implements a method for enabling command interoperability between distributed platforms that each operate a set of servers on behalf of content providers. The method involves receiving a command targeting a particular configuration that a first distributed platform deploys to a server that is operated by a second distributed platform. The method identifies the server of the second distributed platform that is deployed with the particular configuration. The method communicably couples to a command invocation system of the second distributed platform and issues the command to the command invocation system for issuance of the command to the identified server.

20 Claims, 8 Drawing Sheets

U.S. PATENT DOCUMENTS

| | | | |
|---|---|---|---|
| 7,111,057 B1 | 9/2006 | Sherman et al. | |
| 7,340,505 B2 | 3/2008 | Lisiecki et al. | |
| 7,441,045 B2 | 10/2008 | Skene et al. | |
| 7,562,153 B2 | 7/2009 | Biliris et al. | |
| 7,660,896 B1 | 2/2010 | Davis et al. | |
| 7,779,135 B2 | 8/2010 | Hudson et al. | |
| 8,117,276 B1* | 2/2012 | Sakata et al. | 709/214 |
| 8,117,306 B1 | 2/2012 | Baumback et al. | |
| 8,275,851 B1* | 9/2012 | Sakata et al. | 709/214 |
| 2002/0069163 A1 | 6/2002 | Gilbert | |
| 2002/0077977 A1 | 6/2002 | Neely et al. | |
| 2002/0078233 A1* | 6/2002 | Biliris et al. | 709/238 |
| 2002/0116444 A1 | 8/2002 | Chaudri et al. | |
| 2002/0188584 A1 | 12/2002 | Ghannam et al. | |
| 2003/0093523 A1 | 5/2003 | Cranor et al. | |
| 2003/0115141 A1 | 6/2003 | Felix et al. | |
| 2003/0115283 A1 | 6/2003 | Barbir et al. | |
| 2003/0149581 A1 | 8/2003 | Chaudhri et al. | |
| 2003/0229682 A1 | 12/2003 | Day | |
| 2004/0249939 A1 | 12/2004 | Amini et al. | |
| 2005/0120107 A1 | 6/2005 | Kagan et al. | |
| 2005/0181796 A1 | 8/2005 | Kumar et al. | |
| 2005/0198269 A1 | 9/2005 | Champagne et al. | |
| 2005/0216569 A1 | 9/2005 | Coppola et al. | |
| 2007/0168517 A1 | 7/2007 | Weller et al. | |
| 2007/0174442 A1* | 7/2007 | Sherman et al. | 709/223 |
| 2007/0250560 A1 | 10/2007 | Wein et al. | |
| 2009/0031376 A1 | 1/2009 | Riley et al. | |
| 2009/0055506 A1 | 2/2009 | Hudson et al. | |
| 2009/0172167 A1* | 7/2009 | Drai et al. | 709/226 |
| 2010/0036954 A1 | 2/2010 | Sakata et al. | |
| 2011/0029668 A1 | 2/2011 | Menai | |
| 2011/0055370 A1 | 3/2011 | Kern et al. | |
| 2011/0060812 A1 | 3/2011 | Middleton | |
| 2011/0078327 A1 | 3/2011 | Li et al. | |
| 2011/0131341 A1 | 6/2011 | Yoo et al. | |
| 2011/0191477 A1 | 8/2011 | Zhang et al. | |
| 2011/0299550 A1 | 12/2011 | Karaoguz et al. | |

OTHER PUBLICATIONS

Elisa Turrini, An architecture for Content Distribution Internetworking, University of Bologna, Mar. 2004, pp. 1-177.

* cited by examiner

SYSTEMS AND METHODS FOR INVOKING COMMANDS ACROSS A FEDERATION

CLAIM OF BENEFIT TO RELATED APPLICATIONS

This application is a continuation of U.S. non-provisional application Ser. No. 13/449,183, entitled "Systems and Methods for Invoking Commands Across a Federation", filed Apr. 17, 2012 which is a continuation of U.S. non-provisional application Ser. No. 13/336,592, entitled "Systems and Methods for Invoking Commands Across a Federation", filed Dec. 23, 2011, now U.S. Pat. No. 8,190,702 which is a continuation of U.S. non-provisional application Ser. No. 13/246,762, entitled "Systems and Methods for Invoking Commands Across a Federation", filed Sep. 27, 2011, now U.S. Pat. No. 8,117,276 which claims the benefit of U.S. provisional application 61/524,294, entitled "Open Content Delivery Network Platform with Capacity Exchange", filed Aug. 16, 2011. The contents of applications Ser. Nos. 13/449,183, 13/336,592, 13/246,762 and 61/524,294 are hereby incorporated by reference.

TECHNICAL FIELD

The present invention relates to a federated platform of multiple interoperating content delivery networks (CDNs) and more specifically, to command invocation in the federated platform.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs. Each of the CDNs today operates independently of one another. However, this independent operational model is less than ideal for the CDNs and the customers of the CDNs. The CDNs directly compete with one another to offer the same intrinsic services. To do so, the CDNs duplicate capacity and infrastructure where other CDNs have already deployed capacity and infrastructure. The independent operational model also affects customers because a first CDN may optimally deliver content to a first region and a second CDN may optimally deliver content to a second region and a customer operating in both the first and second regions is forced to choose between the two CDNs or is forced to incur additional costs in obtaining services of both CDNs.

CDN federation is advocated by EdgeCast Networks Inc. of Santa Monica, Calif. as a way to address these existing shortcomings and also as a way to provide dynamic CDN scalability, provide a larger global CDN footprint, and increase utilization of a CDN operator's capacity by making some or all of that capacity available to multiple CDN service providers who then, in turn, can realize advantages of a CDN without the need to develop the optimized software and without the need to deploy the infrastructure necessary for a CDN. It is envisioned that CDNs participating in the federation can exchange capacity with one another such that CDNs with excess capacity can avoid the sunk costs associated with capacity going unused by selling that capacity to CDNs that are in need of additional capacity. The capacity sold by a CDN seller can then be configured and used by a CDN buyer to deploy at least one of its customer's configuration to the acquired capacity of the CDN seller. In this manner, a customer's configuration can be deployed from a native CDN to a foreign CDN or the customer's configuration can be simultaneously deployed across capacity of two or more independently operated CDNs. It is further envisioned that participants in the federation can continue to independently manage and operate their networks with minimal change required to participate in the federation.

The CDN interoperation envisioned for the federation introduces issues and complexities that are not readily addressable with existing systems of the federation participants. In many cases, the software and hardware of the CDNs envisioned for the federation are highly customized and proprietary. As some examples, the CDNs internally use identifiers, formats, commands, and protocols that are incompatible with those of other CDNs.

Accordingly, to enable the envisioned federation, systems and methods are needed to permit intercommunication between the independently operated CDNs. Intercommunication in the context of the federation relates to the ability to address capacity across different federation participants, deploy customer configurations across servers of different federation participants, route requests and traffic across configurations that have been deployed to servers of different federation participants, issue commands that invoke actions across the federation, and monitor configurations that have been deployed to servers of different federation participants. Specifically, there is a need to provide systems and methods with which commands such as loads and purges are invoked across the federation irrespective of which servers of which federation participants the commands target.

SUMMARY OF THE INVENTION

It is an object of the embodiments described herein to facilitate intercommunication between participants of a federation that independently operate distributed platforms comprising different sets of servers. More specifically, it is an object to facilitate the intercommunication by adapting commands that originate from a first federation participant for execution across servers of a second federation participant. In some embodiments, the federation is the Open CDN platform conceived by Edgecast Networks Inc. and the federation participants include content delivery networks (CDNs) and other service providers of distributed platforms.

To achieve these and other objects, some embodiments provide different frameworks for seamlessly issuing and executing commands across servers of different participants of the federation. Specifically, the different frameworks facilitate the issuance and execution of a command that originates from a first federation participant and that is intended for execution at one or more servers of a second federation participant as a result of the first federation participant (1) acquiring some capacity from the one or more servers of the second federation participant and (2) deploying a configuration for one of its customers to the acquired capacity of the one more servers of the second federation participant. The commands enable the customer or other configuration administrator of the first federation participant to control operation of the configuration even when it is deployed to the servers of the second federation participant. For example, the customer of the first federation participant can seamlessly control what content is purged from or loaded to the servers of the second federation participant using any one of the different frameworks described below.

In a first framework that is in accordance with some embodiments, the federation establishes peer-to-peer relationships between the command invocation systems (e.g., purge/load servers, command staging servers, etc.) of the different federation participants. Moreover, the command invocation systems of the different federation participants are modified to identify configurations that have been exposed to servers of other federation participants. When a command invocation system that is operated by a first federation participant identifies an issued command that targets a configuration exposed to servers of a second federation participant, the command invocation system passes the issued command to the command invocation systems of the second federation participant which then internally distributes the command to the appropriate set of servers of the second federation participant that have been deployed with the exposed configuration. The command invocation system of the second federation participant monitors the execution of the command and reports the status of the execution to the command invocation system of the first federation participant. In this manner, an administrator for a configuration of the first federation participant that is deployed to servers of the second federation participant can nevertheless seamlessly control operation of that configuration by issuing commands to those servers.

In a second framework that is in accordance with some embodiments, the federation provides at least one command invocation system that peers with the servers of the different federation participants irrespective of which federation participants operate the servers. The federation command invocation system originates and issues commands to the appropriate servers for execution. The federation command invocation system additionally monitors the execution of the servers. In this framework, the federation command invocation system may (1) wholly replace the command invocation systems of the federation participants, (2) use the command invocation systems of the distributed platforms as pass-throughs, or (3) use the command invocation systems for issuance and execution of commands that target internal configurations, whereas the federation command invocation system is used for issuance and execution of commands that target configurations that are exposed by a first federation participant to servers of a second federation participant.

In a third framework that is in accordance with some embodiments, the federation provides at least one command broker to peer with the command invocation systems of the different federation participants. The command broker facilitates the exchange of commands between command invocation systems of different federation participants. Specifically, the command broker serves as an intermediary to distribute commands to the command invocation systems of the appropriate federation participants and can further perform command verification to ensure that a command originated from a command invocation system of a first federation participant is properly specified for execution on servers of a second federation participant.

In a fourth framework that is in accordance with some embodiments, the command broker facilitates the direct passing of commands that originate from a command invocation system of a first federation participant to the servers of a second federation participant for execution.

In a fifth framework that is in accordance with some embodiments, a portal or application programming interface (API) is provided for customers or configuration administrators to issue commands that the portal or API passes to the appropriate servers of the federation for execution irrespective of which federation participants operate those servers.

In a sixth framework that is in accordance with some embodiments, a portal or API is provided for customers and configuration administrators to issue commands that the portal or API passes to the command invocation systems of the appropriate federation participants. The command invocation systems then control the issuance of the commands to the appropriate servers.

Some other embodiments leverage the provided frameworks to promote command interoperability by having the servers of each particular federation participant pull the commands from either the command invocation system of the particular federation participant, the federation command invocation system, the command broker, or the portal/API.

In some embodiments, the frameworks implement additional functionality (1) to perform command verification such that different command formats of different federation participants are mapped properly for execution by servers of other federation participants, (2) to monitor execution of issued commands, (3) to identify which federation participants or which servers of different federation participants customer configurations have been exposed to.

BRIEF DESCRIPTION OF THE DRAWINGS

In order to achieve a better understanding of the nature of the present invention, preferred embodiments for the various frameworks with which commands are executed across the federation will now be described, by way of example only, with reference to the accompanying drawings in which.

DETAILED DESCRIPTION

Figure 1:
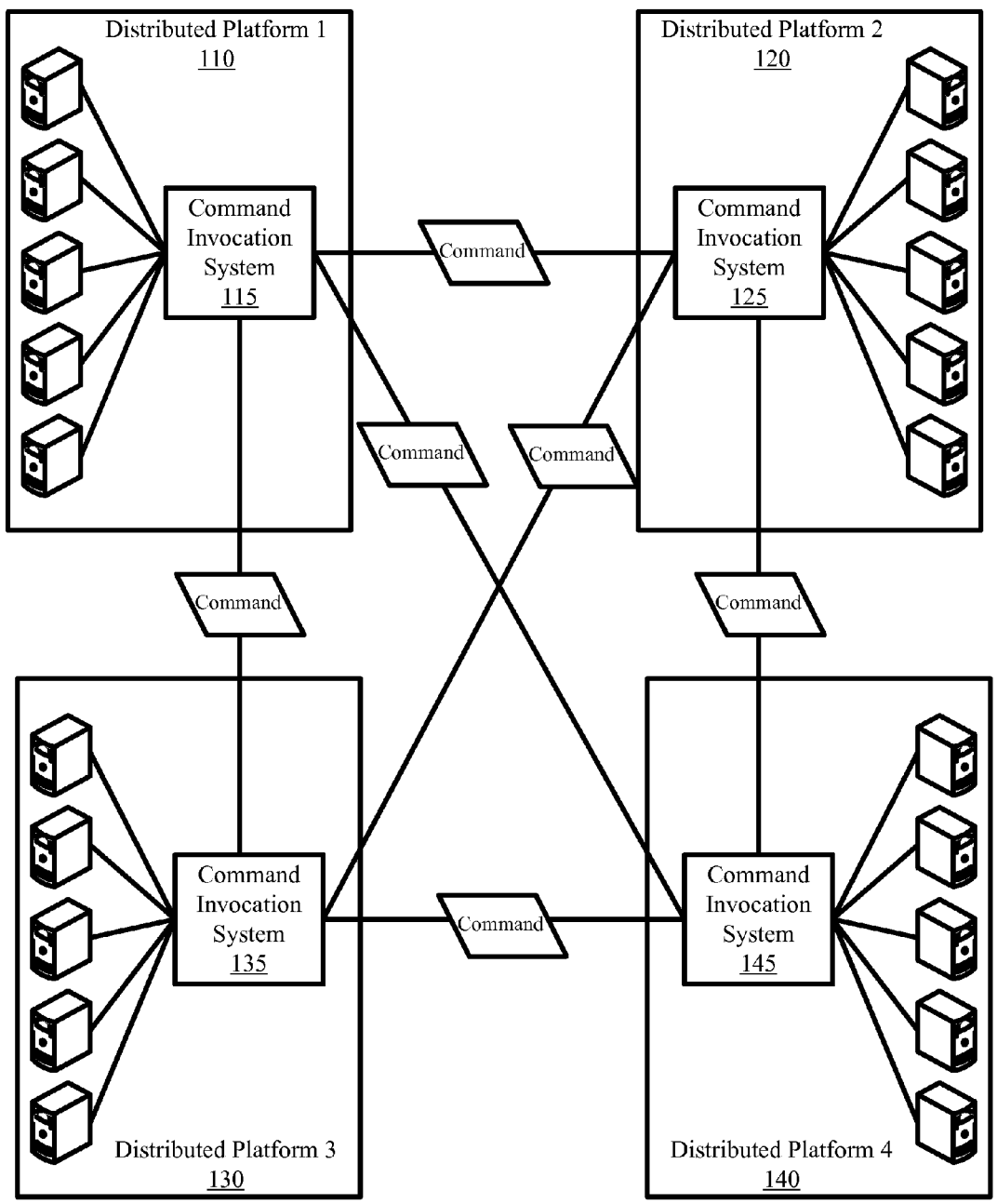
FIG. 1 presents a first framework in accordance with some embodiments for promoting command interoperability in the federation.

In the following detailed description, numerous details, examples, and embodiments for various frameworks with which commands can be executed across a federation of independently operated distributed platforms are set forth and described. As one skilled in the art would understand in light of the present description, these frameworks are not limited to the embodiments set forth, and these frameworks may be practiced without some of the specific details and examples discussed. Also, reference is made to the accompanying figures, which illustrate specific embodiments in which the frameworks can be practiced. It is to be understood that other embodiments can be used and structural changes can be made without departing from the scope of the embodiments herein described.

Various terms are defined to aid in the discussion below. The term federation refers to a framework that promotes the interoperation of multiple independently operated distributed platforms that interoperate by exchanging capacity with one another such that a first distributed platform with excess capacity can make its excess capacity available for a fee or other exchange terms to a second distributed platform that is need of additional capacity. One example of a federation is the Open CDN platform that is conceived by Edgecast Networks Inc. of Santa Monica, Calif. and that is further described in the U.S. provisional patent application 61/524,294 entitled "Open Content Delivery Network Platform with Capacity Exchange", filed Aug. 16, 2011.

The term federation participant is used to describe a distributed platform that participates in the federation by making its unused capacity available for other participants to purchase, by acquiring capacity from another participant, or by deploying a configuration to servers of another participant. A distributed platform need not participate in the federation at all times (by buying, selling, or configuring capacity) to be a federation participant. Federation participants can include any content delivery network (CDN) operator or service provider, any provider of hosting, caching, or cloud services, and any operator or service provider of a set of distributed servers. Some examples of federation participants include CDNs such as Edgecast, Akamai, Limelight, CDNetworks, and Mirror Image. Other examples of federation participants include Amazon CloudFront, Amazon EC2, AT&T, and Web.com.

The term command invocation system refers to the one or more servers that control the issuance and execution of commands within a particular distributed platform. The command invocation system for a CDN may include an interface, command server, and zero or more staging servers. The interface is typically accessible to administrators or customers through a web browser. The interface enables a configuration administrator or customer to originate commands for execution by one or more servers of the distributed platform that are deployed with the administrator's or customer's configuration. For a distributed platform that is a CDN, some such commands include a purge command to remove content cached by the servers and a load command to preload content to the servers before the content is requested by users. The interface then passes the specified commands to the command server preferably over an encrypted or secure communication channel. The command server may also originate commands based on a policy rule that a customer has set, wherein the policy rule includes conditions that specify when certain commands are to be automatically issued by the command server. The command server is then tasked with verifying the commands, issuing the commands to the appropriate servers of the distributed platform for execution, and monitoring command execution. The command server may utilize one or more staging servers to assist in the issuing of commands to the appropriate servers. For a distributed platform that is a CDN, the command server may include a purge/load server.

The term command verification refers to processes performed by the federation participants or components of the federation to ensure that issued commands are executable by different federation participants. This may include ensuring that issued commands conform to a set of commands and command formats of the federation. This may also include dynamic mapping of commands to conform to commands and command formats of the distributed platform receiving the commands, wherein each distributed platform may conform to a native or proprietary set of commands and command formats.

The term command issuance refers to the distribution of a command from a source to a destination over a digital medium or network. The source and destination may be identified using Internet Protocol (IP) addresses or other addressing that is well established in the art. The distribution from the source to the destination may include the traversal of multiple intermediaries that may include different command invocation systems, command brokers (described below), and servers. Moreover, command issuance may involve either push or pull mechanisms. For example, a command invocation system may push commands to servers that are within its control. Alternatively, servers of a distributed platform may pull commands from a command invocation system that is within the same distributed platform as the server.

The term execution monitoring refers to the identification of whether an issued command was successful executed. This may include a status indication and may additionally include reporting of a result that is produced from the execution of a command.

Though existing command invocation systems of the federation participants are well suited to issue commands and monitor command execution within a single distributed platform that the command invocation system is integrated with, these command invocation systems are incompatible with one another and do not feature intercommunication mechanisms whereby the command invocation system of a first federation participant can issue a command to the command invocation system of a second federation participant for execution by servers of the second federation participant. Such command interoperability is a necessary function for the envisioned federation that enables a first federation participant to deploy a configuration for one of its customers partially or wholly to one or more servers of a second federation participant for execution thereon. Accordingly, command interoperability is needed in the federation so that an administrator or customer of a first federation participant can issue commands to control operation of a configuration regardless of which servers of which federation participants that configuration is deployed.

To enable command interoperability for the federation of distributed platforms, the embodiments described herein provide different frameworks (1) for seamlessly issuing and executing commands across servers of different federation participants and (2) for monitoring command execution across different servers operated by different federation participants. In so doing, the different frameworks facilitate the seamless issuance and execution of a command that originates from a first federation participant and that is intended for execution at one or more servers of a second federation participant as a result of the first federation participant (1) acquiring some capacity from the one or more servers of the second federation participant and (2) deploying a configuration for one of its customers to the acquired capacity of the one more servers of the second federation participant.

The enabled command interoperability applies to any commands used within a distributed platform, but for purposes of simplicity load and purge commands are primarily used in the below description. However, the exemplary usage of the load and purge commands is not intended to be restrictive or limiting in any way and that the presented frameworks enable interoperability for other commands in addition to or instead of the load and purge commands. Furthermore, it should be apparent to one of ordinary skill in the art that the enabled interoperability applies to the same command that is implemented differently by different federation platforms. For example, a purge command may include deleting one or more files or directories, invalidating one or more files or directories, or renaming files or directories for subsequent deletion during a time of low resource utilization.

FIG. 1 presents a first framework in accordance with some embodiments for promoting command interoperability in the federation. The framework of FIG. 1 illustrates four distributed platforms 110, 120, 130, and 140. Each distributed platform independently operates a set of servers and includes a command invocation system to control the issuance and execution of commands for its set of servers. The first distributed platform 110 includes command invocation system 115, the second distributed platform 120 includes command invocation system 125, the third distributed platform 130 includes command invocation system 135, and the fourth distributed platform 140 includes command invocation system 145. The distributed platforms 110, 120, 130, and 140 participate in the federation (i.e., the Open CDN platform) that is envisioned for the embodiments described herein. As a result of this participation, it is possible that a server of the distributed platform 110 can be deployed with a configuration for a customer of distributed platform 120. The deployment of the configuration causes the server of the distributed platform 110 to perform content delivery or some other service on behalf of the customer of distributed platform 120. Results for the content delivery or other service are reported back to the distributed platform 120 for presentation to the customer.

The interoperability provided by the framework of FIG. 1 enables the customer of the distributed platform 120 to seamlessly control operation of the deployed configuration by issuing commands to the server of the distributed platform 110. To provide such interoperability, the framework of FIG. 1 establishes a peering relationship between each of the command invocation systems 115, 125, 135, and 145. The peering relationship may be established with a static or dynamic connection between the command invocation systems 115, 125, 135, and 145. The peering connections may be encrypted or secured. The peering connections may also be authenticated such that a particular command invocation system recognizes and accepts commands that originate from other command invocation systems. Through the peering relationships, the command invocation systems exchange commands with one another and monitor the execution of the exchanged commands.

Each command specifies at least an operation to perform and an identifier for a target of the operation. The identifier may identify the IP addresses or other addressing for the servers to which a particular configuration has been deployed, where the servers are the target of the command operation. Alternatively, the identifier may identify a configuration that has been deployed to one or more servers. Each command invocation system then queries a database using the identifier to identify which federation participants or which servers of which federation participants the configuration has been deployed to. The database may be integrated as part of each command invocation system, each distributed platform, or the federation where it is shared by all command invocation systems.

Based on the addressing of the servers or the results of the database query, the command invocation system determines whether (1) to issue the command to a command invocation system of a different distributed platform participating in the federation, (2) to issue the command internally to one or more servers that directly receive commands from the command invocation system, or (3) to issue the command to some combination thereof.

For a command that is issued from a first command invocation system of a first distributed platform to a second command invocation system of a second distributed platform, the peering relationship enables the first command invocation system to monitor execution of the command across servers of the second distributed platform. Specifically, the second command invocation system monitors the execution states of the command across the servers of the second distributed platform and the second command invocation system reports the execution states back to the first command invocation system. The first command invocation system can combine the execution states with execution states that it obtains by monitoring servers of the first distributed platform or with execution states that it obtains from other command invocation systems in order to produce a holistic view of the command execution across the federation.

In some embodiments of the framework of FIG. 1, each command invocation system conforms to a standard set of commands as specified by the federation. In so doing, each federation participant internally supports the same set of commands and command formats. The commands can then be passed without modification from a command invocation system of a first distributed platform to a command invocation system of a second distributed platform. The command invocation system of the second distributed platform issues the received command to servers of the second distributed platform that are deployed with a configuration that is the target of the received command. The servers of the second distributed platform execute the issued command even though the command originated from the first distributed platform. In some embodiments, the command invocation systems 115, 125, 135, and 145 implement a common application programming interface (API) that defines the supported commands and command formats of the federation.

In some embodiments of the framework of FIG. 1, the independent operation of the distributed platforms 110, 120, 130, and 140 is fully preserved by allowing each distributed platform to continue using commands that are formatted according to proprietary formats of the distributed platform even when such formats may be incompatible with formats used by other federation participants. In some such embodiments, each command invocation system is enhanced with an API (not shown) that maps between the command format of the distributed platform that it is integrated with and a federation specified format. Consequently, a command invocation system only maps commands that are issued outside the distributed platform to the federation specified format and the command invocation system maps from the federation specified format to an internal format for commands that are received from other command invocation systems.

Figure 2:
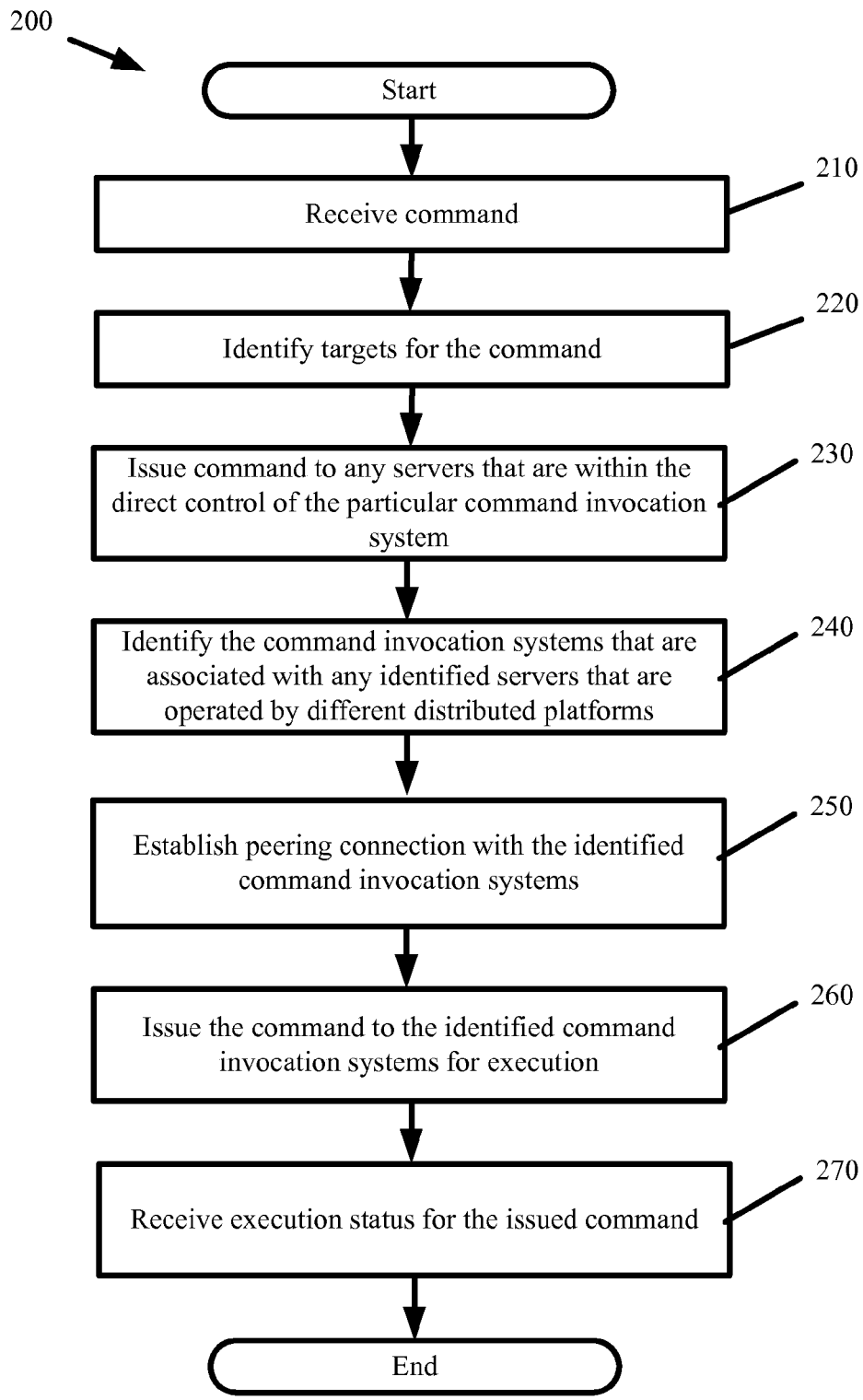
FIG. 2 presents a process performed by a particular command invocation system that operates within the framework of FIG. 1 to facilitate command interoperability in accordance with some embodiments.

FIG. 2 presents a process 200 performed by a particular command invocation system that operates within the framework of FIG. 1 to facilitate command interoperability in accordance with some embodiments. The process 200 begins when a command is received (at 210) by the particular command invocation system. The process identifies (at 220) the targets for the command. To do so, the process extracts the IP addresses or other addressing that identify the intended targets for the command. Alternatively, the process may extract an identifier from the command that identifies the configuration that the command operation is to be performed against. The process then performs a lookup of the configuration against a database to identify which distributed platforms or servers the configuration has been deployed to and that are the targets of the command.

The process issues (at 230) the command to any servers that are within the control of the particular command invocation system. These servers are servers that are within the same distributed platform that the particular command invocation system is integrated with. Next, the process identifies (at 240) the command invocation systems that are associated with any identified servers that are operated by different distributed platforms. The process then establishes (at 250) a peering connection with the identified command invocation systems and issues (at 260) the command to the identified command invocation systems for execution. The process ends upon receiving (at 270) execution status for the issued command, wherein the particular invocation command system directly identifies execution status for the servers within the same distributed platform as the particular invocation command system and indirectly identifies from the peered command invocation systems execution status for the servers that are operated by other distributed platforms.

Figure 3:
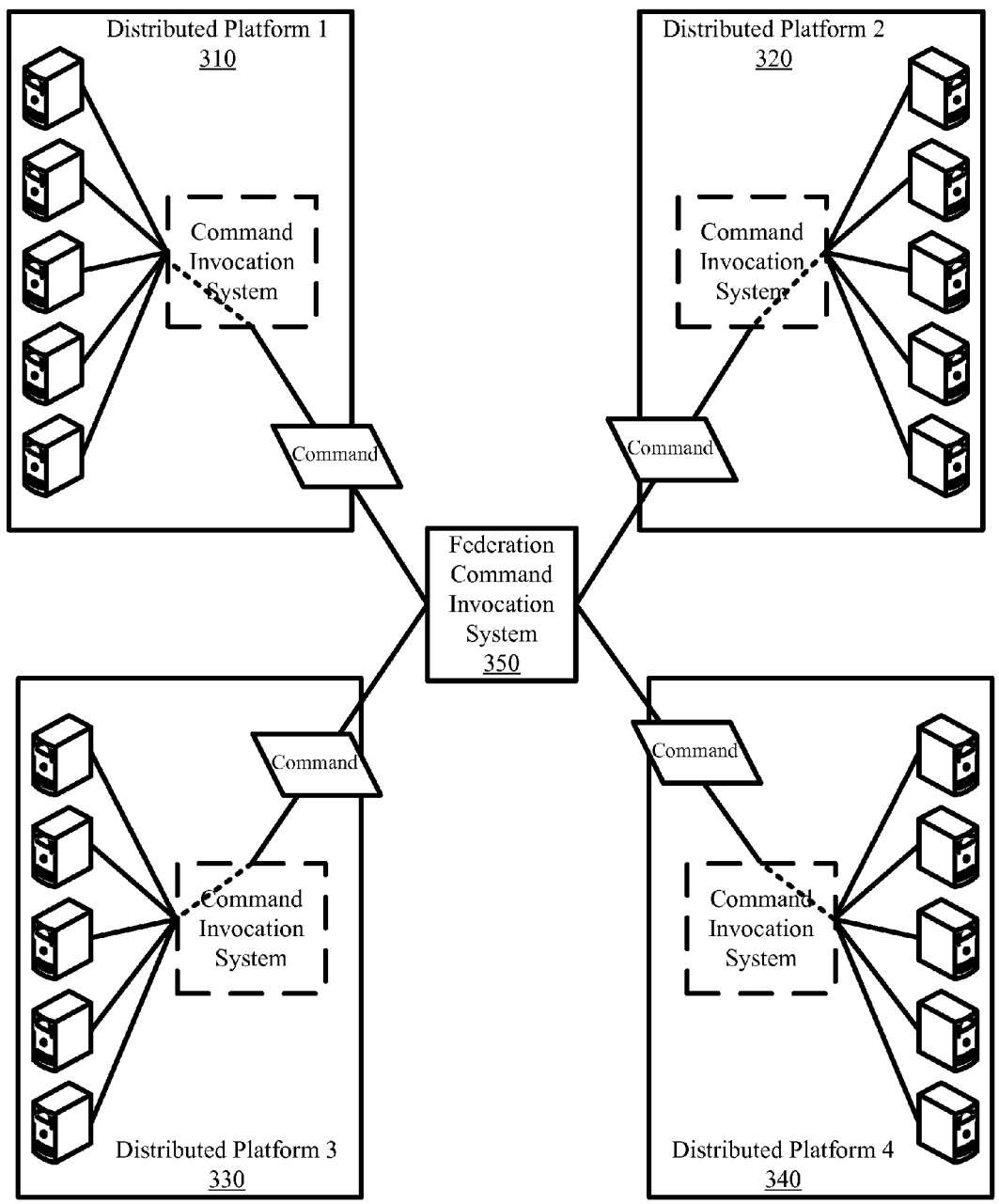
FIG. 3 presents a second framework in accordance with some embodiments for promoting command interoperability in the federation.

FIG. 3 presents a second framework in accordance with some embodiments for promoting command interoperability in the federation. As in FIG. 1, the framework of FIG. 3 illustrates four distributed platforms 310, 320, 330, and 340 that each independently operate a set of servers. However, a federation command invocation system 350 is provided to control the issuance and execution of commands for each set of servers of the distributed platforms 310, 320, 330, and 340.

In some embodiments of the framework of FIG. 3, the command invocation systems of the distributed platforms 310, 320, 330, and 340 may be decommissioned and the federation command invocation system 350 is directly peered to the servers of the different distributed platforms 310, 320, 330, and 340, preferably using a secure or encrypted communication channel. In some such embodiments, the federation command invocation system 350 stores the IP addressing and authentication parameters to directly peer with the servers of the different distributed platforms 310, 320, 330, and 340. The peering enables the federation command invocation system 350 to issue commands to any of the servers of the distributed platforms 310, 320, 330, 340 participating in the federation for execution and to monitor command execution on the servers.

Though not shown, the federation command invocation system 350 may access a database to identify the targets for different commands. More specifically, when a customer originates a command for a configuration, the federation command invocation system 350 accesses the database to identify which servers the configuration of the customer is deployed to and thereby identify the targets for the command. In some embodiments, the federation command invocation system 350 includes an interface or portal for customers of the distributed platforms 310, 320, 330, and 340 to issue commands. Before issuing a command, a customer is required to login. Once logged in, the federation command invocation system 350 accesses the database to identify deployed configurations for the customer. The customer can then specify a command to issue to a particular configuration and based on information stored to the database, the federation command invocation system 350 identifies which servers to issue the command to.

In some embodiments, the federation command invocation system 350 may store policy rules that have been specified by customers or configuration administrators. The federation command invocation system 350 processes the policy rules to automatically issue commands per conditions set in the policy rules.

In some embodiments of the framework of FIG. 3, the command invocation systems of the distributed platforms may be reconfigured to operate as pass through devices that forward commands issued from the federation command invocation system 350 to the appropriate set of servers.

In some embodiments, the command invocation systems of the distributed platforms continue to operate by controlling the issuance and execution of commands for internal configurations that have not been deployed to a server of another distributed platform. In some such embodiments, the federation command invocation system 350 supplements the function of the distributed platform command invocation systems by controlling the issuance and execution of commands only for configurations that have been deployed from a native distributed platform to a foreign distributed platform or in other words, for configurations that a first distributed platform deploys to servers of a second distributed platform.

Figure 4:
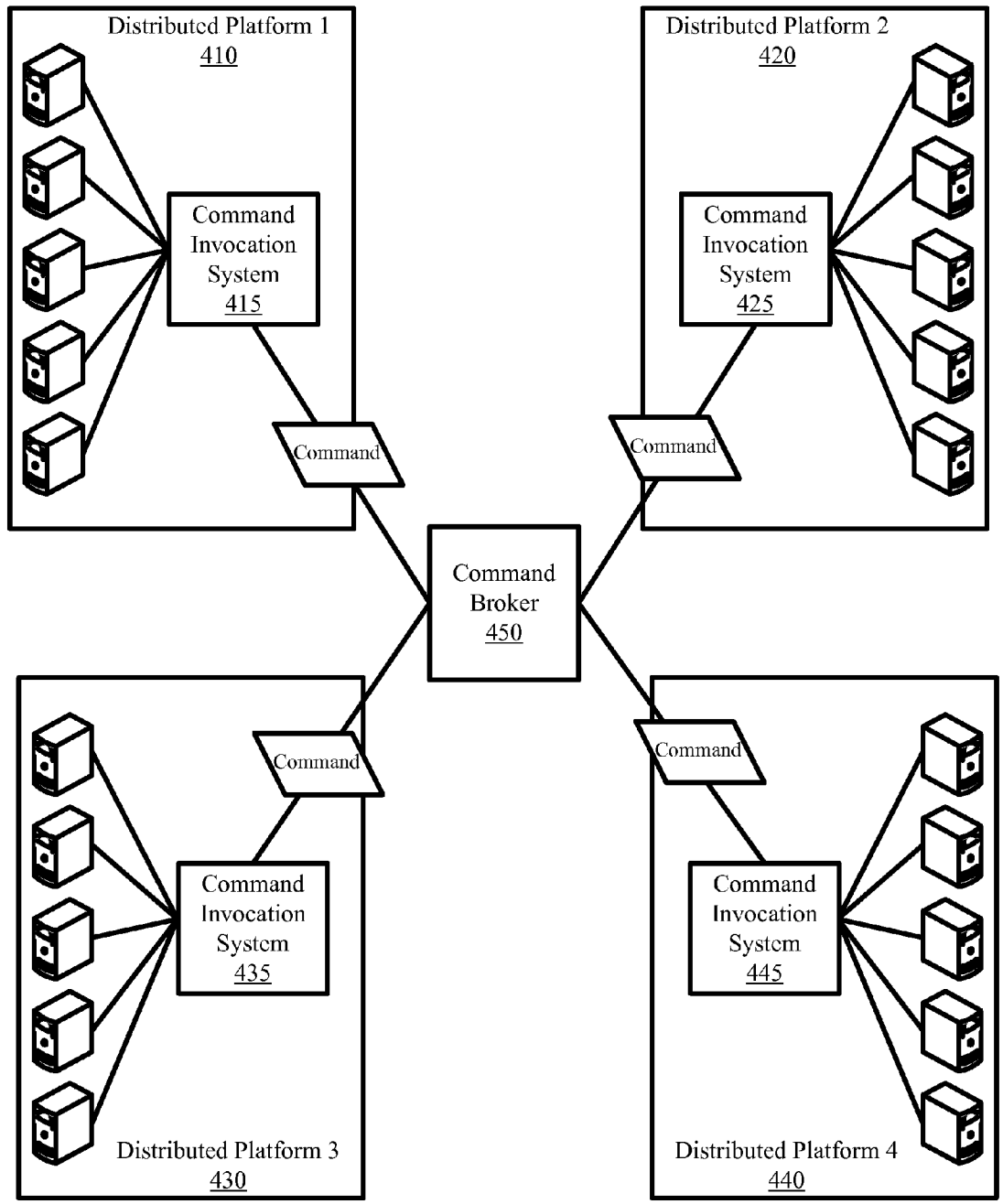
FIG. 4 presents a third framework in accordance with some embodiments for promoting command interoperability in the federation.

FIG. 4 presents a third framework in accordance with some embodiments for promoting command interoperability in the federation. The framework includes the distributed platforms 410, 420, 430, and 440 and the command invocation systems 415, 425, 435, and 445 for each of the distributed platforms. The framework also introduces the command broker 450. The command broker 450 is operated by the federation and facilitates the exchange of commands between the command invocation systems 415, 425, 435, and 445. The command broker 450 is peered to each of the command invocation systems 415, 425, 435, and 445 preferably using a secure or encrypted connection. The command broker 450 acts as an intermediary that fans out commands across the federation on behalf of a command originator (e.g., command invocation systems 415, 425, 435, or 445). Additionally, the command broker 450 monitors the execution status of the command across the other federation participants on behalf of the command originator. In so doing, the command broker 450 reduces the overhead for each command originator that issues commands targeting servers outside of the distributed platform that it is integrated with. For example, when the command invocation system 415 of the distributed platform 410 issues a command that targets servers operated by the distributed platforms 420, 430, and 440, the command invocation system 415 would ordinarily have to manage overhead resulting from (1) peering with each of the command invocation systems 425, 435, and 445 of the distributed platforms 420, 430, and 440, (2) issuing the command to the command invocation systems 425, 435, and 445, and (3) monitoring command execution from the command invocation systems 425, 435, and 445. However by peering with the command broker 450 instead of the other command invocation systems 425, 435, and 445, the command invocation system 415 needs only to manage overhead with the command broker 450 and the command broker 450 maintains the overhead on behalf of the system 415 for peering with, issuing the command to, and monitoring execution status from the other command invocation systems 425, 435, 445.

Other functions of the command broker 450 may include command verification to ensure that a command originated from a command invocation system of a first federation participant is properly specified for execution on servers of a second federation participant. As part of command verification, the command broker 450 may reformat commands received from the first distributed platform so that the commands can be executed by servers of the second distributed platform when the second distributed platform uses a different command format than the first distributed platform.

In some embodiments, the command broker 450 appears to the command invocation systems of the distributed platforms as another server that receives all commands for configurations that have been exposed outside the native distributed platform. As with other frameworks, the command broker 450 couples to a database to identify which servers of which distributed platforms a command targets. Using the table, the command broker 450 then forwards the command to the appropriate servers via the corresponding command invocation systems.

Figure 5:
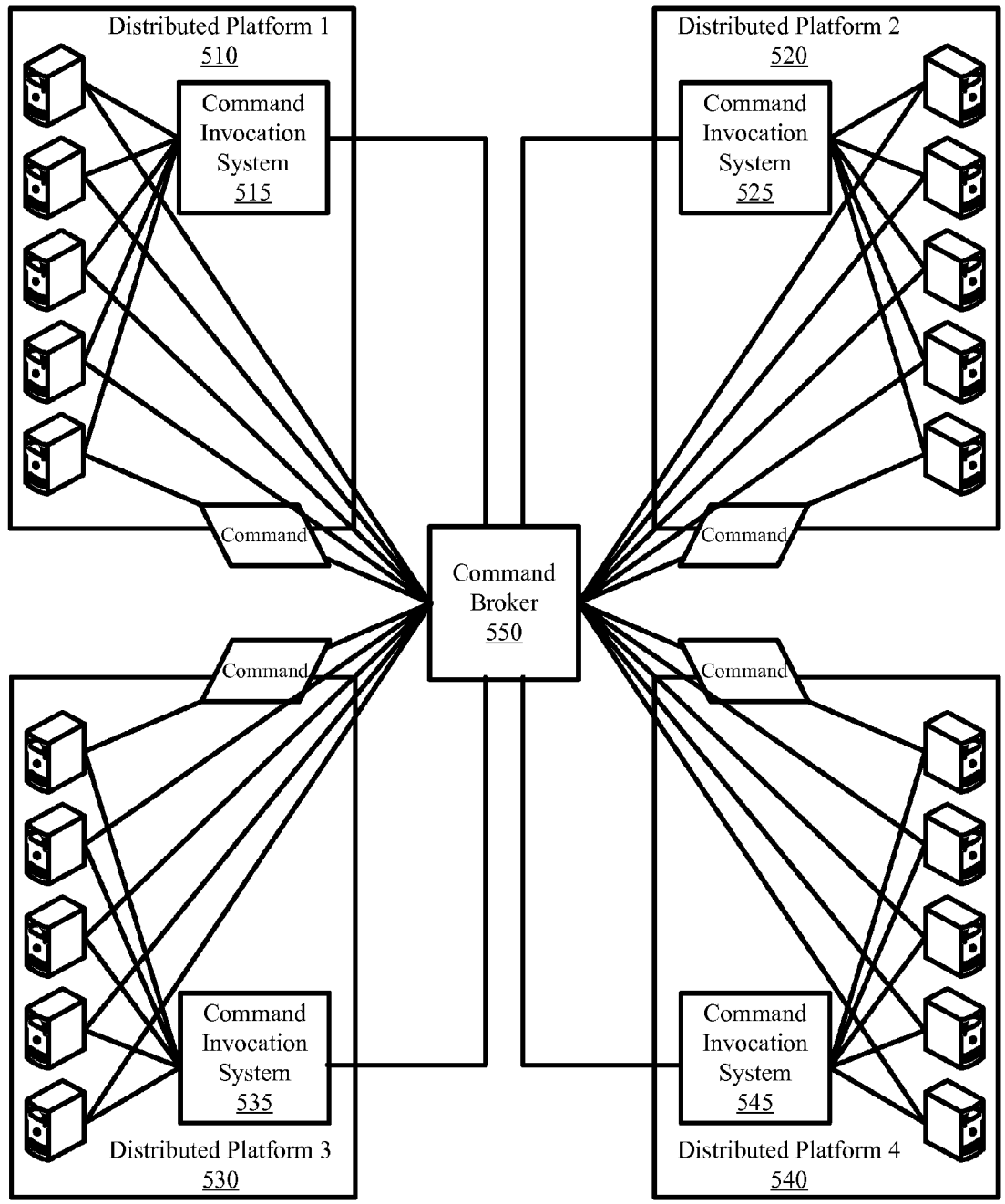
FIG. 5 presents a fourth framework in accordance with some embodiments for promoting command interoperability in the federation.

FIG. 5 presents a fourth framework in accordance with some embodiments for promoting command interoperability in the federation. In this framework, the command broker 550 continues to receive commands that are to be distributed across the federation from the command invocation systems 515, 525, 535, 545 of the distributed platforms 510, 520, 530, and 540. However, rather than fan out the commands to other command invocation systems, the command broker 550 directly issues the commands to the appropriate servers of the different distributed platforms. The command broker 550 then reports the command execution states back to the command invocation system from which the command originated. The command broker 550 may perform command verification if needed. In some embodiments, the command broker 550 internally maintains the addressing and authentication parameters for issuing commands directly to the servers and also maintains a database to identify which servers are deployed with which configurations. It should be apparent to one of ordinary skill in the art that the database may be maintained separate from the command broker 550.

In some embodiments of the framework of FIG. 5, the command broker 550 issues commands to servers that are operated outside the distributed platform in which a particular command invocation system issuing the command operates. In some such embodiments, the particular command invocation system is still tasked with issuing commands and monitoring command execution for servers that are within the distributed platform in which the particular command invocation system operates. In some other embodiments, the command broker 550 issues commands to all servers that are the target of a command and in so doing, perform command issuance for all the command invocation systems of the federation participants.

Figure 6:
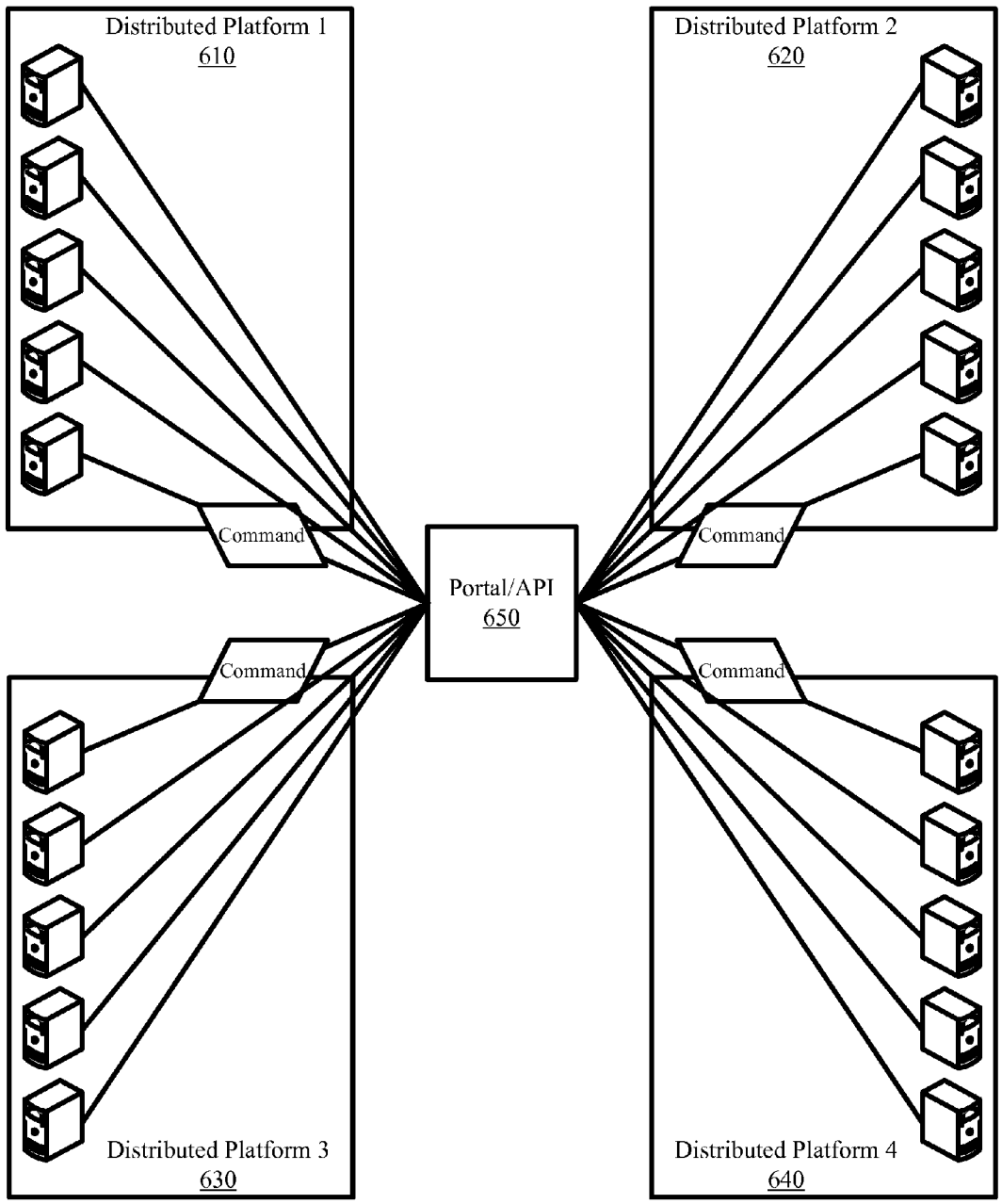
FIG. 6 presents a fifth framework in accordance with some embodiments for promoting command interoperability in the federation.

FIG. 6 presents a fifth framework in accordance with some embodiments for promoting command interoperability in the federation. In this framework, the federation provides a central portal or API 650 for originating commands and for distributing the commands directly to the servers of the different distributed platforms 610, 620, 630, and 640.

In some embodiments of the framework of FIG. 6, customers of the different distributed platforms 610, 620, 630, and 640 are provided access to the portal 650 in order to issue commands to control operation of their deployed configurations. The portal 650 is accessible using a web browser that is directed to an IP address or hostname of the federation (e.g., www.ocdn.com/commandportal). The portal 650 may provide a graphical user interface for the user to login with a username and password. Once logged in, the portal 650 identifies the customer's configurations and a set of commands for controlling or modifying operation of the configurations. The portal 650 then automatically fans out the commands to the appropriate servers to which a customer's configuration is deployed irrespective of whether the configuration is deployed to servers that are operated by different distributed platforms.

In some embodiments of the framework of FIG. 6, the portal 650 is enhanced with or substituted by an API. The API also serves to originate commands on behalf of customers and configuration administrators. The API provides the added functionality for automatically formatting commands to comply with the native command formats of the different distributed platforms when necessary. Also, the API can be used to originate commands automatically based on a prior set of policy rules that are specified by customers or configuration administrators. For example, a policy rule may be set so that servers of a first distributed platform deployed with a customer configuration are purged first when a particular piece of content becomes stale before servers of a second distributed platform that are also deployed with the customer configuration are purged. Additionally, a policy rule may be set so that servers at a geographic region are loaded with a particular piece of content irrespective of whether the servers at the geographic region are operated by different distributed platforms.

Figure 7:
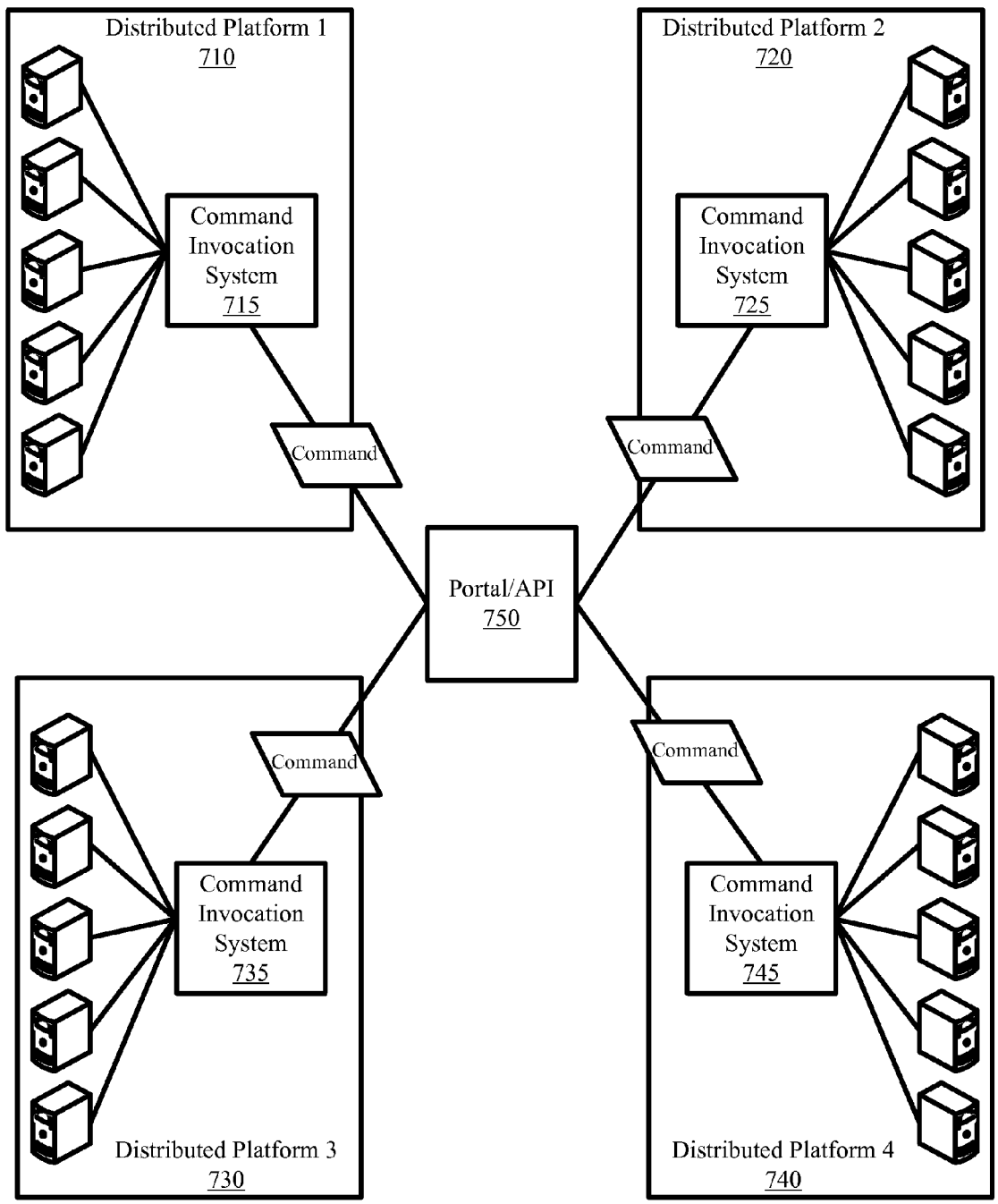
FIG. 7 presents a sixth framework in accordance with some embodiments for promoting command interoperability in the federation.

FIG. 7 presents a sixth framework in accordance with some embodiments for promoting command interoperability in the federation. Similar to the framework of FIG. 6, the framework of FIG. 7 also includes a portal/API 750. However, the portal/API 750 peers with the command invocation systems 715, 725, 735, and 745 of the distributed platforms 710, 720, 730, and 740 participating in the federation instead of directly peering with the servers of the distributed platforms 710, 720, 730, and 740. Commands originated by the portal/API 750 are thus distributed to the appropriate command invocation system.

Some embodiments adapt the frameworks presented in FIGS. 1-7 to promote command interoperability by having the servers of each particular federation participant pull the commands instead of having the commands be pushed to them. For example, an adapted framework of FIG. 1 includes the set of servers of the first distributed platform 110 periodically or continually polling the command invocation system 115 to determine if commands have been issued for the servers to execute. If so, the servers pull from the system 115 the commands that they are to execute. Similarly in an adapted framework of FIG. 3, the servers of the different distributed platforms poll the federation command invocation system 350 to determine if commands have been issued for the servers to execute. If so, the servers pull from the federation command invocation system 350 the commands that they are to execute. Similar adaptations can be made to the frameworks of FIGS. 4-7 such that the servers pull commands from the command broker, federation portal, or federation API.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Furthermore, almost everywhere that a server is identified as a component of the embodied invention, it is understood that the server may be a single physical machine, or a cluster of multiple physical machines performing related functions, virtualized servers co-resident on a single physical machine, or various combinations of the above.

Figure 8:
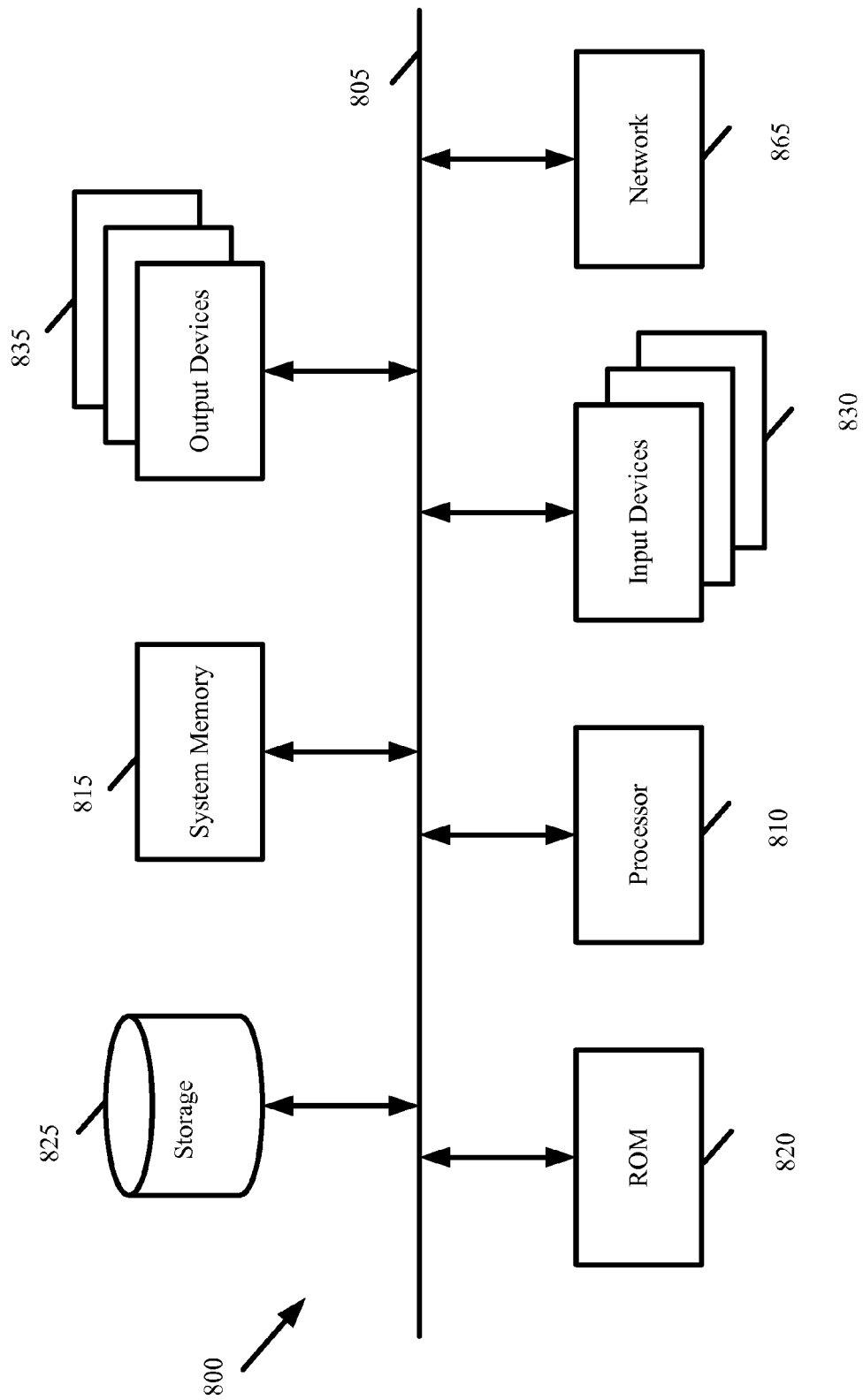
FIG. 8 illustrates a computer system or server with which some embodiments are implemented.

FIG. 8 illustrates a computer system or server with which some embodiments are implemented. Such a computer system includes various types of computer-readable media and interfaces for various other types of computer-readable media that implement the various frameworks described above (e.g., command invocation systems, command broker, and interface portal). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for enabling intercommunication in a federation of a plurality of distributed platforms with each distributed platform of the plurality of distributed platforms independently operating a set of servers, the computer-implemented method comprising:
specifying a federation command format providing a common set of commands supported by each distributed platform of the federation;
receiving a first command originating from a first distributed platform of the federation that is intended for a configuration executing on at least one server that is operated by a second distributed platform of the federation, the first command specified according to a native command format of the first distributed platform, and wherein the native command format is incompatible with the federation command format;
translating the first command from the native command format to a corresponding second command that is specified according to the federation command format; and
issuing the second command to the second distributed platform for execution by the at least one server that is operated by the second distributed platform.

2. The computer-implemented method of claim 1 further comprising translating the second command from the federation command format to a native command format of the second distributed platform prior to issuing the second command to the second distributed platform.

3. The computer-implemented method of claim 1 further comprising providing a broker for translating a command originating from the first distributed platform for execution by a server of the second distributed platform from the native command format of the first distributed platform to the federation command format and for translating a command originating from the second distributed platform for execution by a server of the first distributed platform from the federation command format to the native command format of the first distributed platform.

4. The computer-implemented method of claim 1 further comprising providing a first API when integrating the first distributed platform into the federation, the first API defining translations between the native command format of the first distributed platform and the federation command format.

5. The computer-implemented method of claim 4 further comprising providing a second API when integrating the second distributed platform into the federation, the second API defining translations between a native command format of the second distributed platform and the federation command format.

6. The computer-implemented method of claim 1, wherein the first command comprises an identifier identifying the configuration, and the method further comprises identifying deployment of the configuration to the second distributed platform based on said identifier.

7. The computer-implemented method of claim 1, wherein issuing the second command causes the at least one server that is operated by the second distributed platform to preload content associated with the configuration.

8. The computer-implemented method of claim 1, wherein issuing the second command causes the at least one server that is operated by the second distributed platform to purge content that is associated with the configuration.

9. The computer-implemented method of claim 1 further comprising monitoring performance of the configuration on the at least one server that is operated by the second distributed platform.

10. The computer-implemented method of claim 9 further comprising providing results of monitoring the performance of the configuration to the first distributed platform for at least one of billing and customer presentation.

11. A federated content delivery network (CDN) providing for capacity sharing between a plurality of CDNs participating in the federated CDN, the federated CDN comprising:
   a first CDN comprising a first set of server machines that are independently operated by the first CDN, wherein operation of the first set of server machines is controlled using a first set of native commands of the first CDN;
   a second CDN comprising a second set of server machines that are independently operated by the second CDN, wherein operation of the second set of server machines is controlled using a second set of native commands of the second CDN that is incompatible with the first set of native commands of the first CDN; and
   a broker device enabling the first CDN to control capacity that is allocated from a server machine of the second set of server machines by (i) receiving a particular command of the first set of native commands, (ii) converting the particular command to a corresponding command of the second set of native commands, and (iii) passing the corresponding command to the second CDN for execution by the server machine of the second set of server machines.

12. The federated CDN of claim 11, wherein the broker device comprises a first broker device operating as part of the first CDN and a second broker device operating as part of the second CDN, the first broker device configured with a first API defining conversions between the first set of native commands and a set of federation supported commands and the second broker device configured with a second API defining conversions between the set of federation supported commands and the second set of native commands.

13. The federated CDN of claim 12, wherein the first broker device receives the particular command of the first set of native commands, converts the particular command to a specific supported command of the set of federation supported commands using the first API, and passes the specific supported command to the second broker device, and wherein the second broker device receives the specific supported command, converts the specific supported command to the corresponding command of the second set of native commands using the second API, and passes the corresponding command to the server machine for execution.

14. The federated CDN of claim 11, wherein the broker device is integrated as part of a command and control subsystem of the first CDN.

15. The federated CDN of claim 11, wherein the broker device operates independent of the first CDN and the second CDN.

16. The federated CDN of claim 11, wherein the broker device is further for (i) registering the first CDN as a participant in the federated CDN by defining a translation between the first set of native commands and the set of federation supported commands and (ii) registering the second CDN as a participant in the federated CDN by defining a translation between the second set of native commands and the set of federation supported commands.

17. The federated CDN of claim 11, wherein the broker device comprises a database tracking deployment of a plurality of customer configurations across the first set of server machines and the second set of server machines.

18. A federated content delivery network (CDN) providing for capacity sharing between a plurality of CDNs participating in the federated CDN, the federated CDN comprising:
   a first CDN comprising a first set of server machines and a first API, the first CDN independently operating the first set of server machines, wherein operation of the first set of server machines is controlled using a first set of native commands, and the first API mapping the first set of native commands to a set of federation commands;
   a second CDN comprising a second set of server machines and a second API, the second CDN independently operating the second set of server machines, wherein operation of the second set of server machines is controlled using a second set of native commands, and the second API mapping the second set of native commands to the set of federation commands; and
   a communication link enabling the first CDN to control operation of a server machine of the second set of server machines that is deployed with a configuration for a first CDN customer by submitting a federation command to the second CDN for issuance of the federation command by the second API to the server machine as a corresponding command from the second set of commands.

19. The federated CDN of claim 18, wherein each of the first set of native commands, the set of federation commands, and the second set of native commands comprise a command for purging content from a server machine.

20. The federated CDN of claim 18, wherein each of the first set of native commands, the set of federation commands, and the second set of native commands comprise a command causing a server machine to preload content prior to the server receiving a request for the content.

* * * * *